United States Patent
Shime

(10) Patent No.: US 10,780,464 B2
(45) Date of Patent: Sep. 22, 2020

(54) POWDER SUCTION AND REMOVAL APPARATUS AND POWDER SUCTION AND REMOVAL METHOD

(71) Applicant: Toyo Engineering Corporation, Chiyoda-ku, Tokyo (JP)

(72) Inventor: Hideki Shime, Narashino (JP)

(73) Assignee: TEC PROJECT SERVICES CORPORATION, Narashino-shi, Chiba (JP)

(*) Notice: Subject to any disclaimer, the term of this patent is extended or adjusted under 35 U.S.C. 154(b) by 280 days.

(21) Appl. No.: 15/910,413

(22) Filed: Mar. 2, 2018

(65) Prior Publication Data
US 2018/0250721 A1    Sep. 6, 2018

(30) Foreign Application Priority Data
Mar. 6, 2017    (JP) .................................. 2017-041381

(51) Int. Cl.
*B08B 5/04* (2006.01)
*A47L 5/36* (2006.01)
*A47L 9/12* (2006.01)
*B08B 3/02* (2006.01)
*B01D 46/00* (2006.01)
(Continued)

(52) U.S. Cl.
CPC ................... *B08B 5/04* (2013.01); *A47L 5/36* (2013.01); *A47L 9/12* (2013.01); *B01D 46/00* (2013.01); *B08B 3/02* (2013.01); *B08B 11/00* (2013.01); *F24F 3/161* (2013.01); *B01D 2273/28* (2013.01)

(58) Field of Classification Search
None
See application file for complete search history.

(56) References Cited

U.S. PATENT DOCUMENTS 4,967,645 A    11/1990    Mattson
5,507,859 A    4/1996    Kaiser
(Continued)

FOREIGN PATENT DOCUMENTS

JP    02-056287 A    2/1990
JP    2003-074931 A    3/2003
(Continued)

OTHER PUBLICATIONS

European Search Report for corresponding application No. 18159043. 1, dated Jul. 25, 2018 (8 pages).

Primary Examiner — Eric W Golightly
(74) Attorney, Agent, or Firm — Flynn Thiel, P.C.

(57) ABSTRACT

A suction and removal apparatus which removes highly active pharmacological substances attached to the garments that can re-scatter when changing the clothes and prevents the leakage of such powder to the external environment. The suction and removal apparatus is for sucking and removing in a closed room powder attached to the garments of a person, and includes a suction device, a suction head containing a high efficiency particulate air (HEPA) filter and having a suction port, and a flexible tube connected between the suction device and the suction head. The suction port of the suction head has a cap that closes the suction port, the connection between the suction head and the flexible tube is attachable and detachable, and the suction device is installed outside or inside the room and the suction head and part of the flexible tube are installed inside the room.

11 Claims, 3 Drawing Sheets

(51) Int. Cl.
*F24F 3/16* (2006.01)
*B08B 11/00* (2006.01)

(56) References Cited

U.S. PATENT DOCUMENTS 6,671,924 B1 * 1/2004 Rood ...................... A47L 5/38
 15/301
2004/0226273 A1   11/2004 Lorey et al.

FOREIGN PATENT DOCUMENTS

JP   2007-139420 A   6/2007
JP   2016-003509 A   1/2016

* cited by examiner

POWDER SUCTION AND REMOVAL APPARATUS AND POWDER SUCTION AND REMOVAL METHOD

FIELD OF THE INVENTION

The present invention relates to a suction and removal apparatus for sucking and removing powder, such as highly active pharmacological substances, a powder suction and removal method using the suction and removal apparatus, a suction and removal system using the suction and removal apparatus, and a suction and removal method using the suction and removal system.

BACKGROUND OF THE INVENTION

In a manufacturing site for pharmaceuticals and agrochemicals, such as a cleanroom, highly active pharmacological substances such as pharmaceutical raw materials and agrochemical raw materials are used. Problems of health impairment are presented when workers are exposed to hazardous highly active pharmacological substances, and problems of environmental contamination are presented when external leakage of highly active pharmacological substances occurs.

According to the Japan Affiliate of International Society for Pharmaceutical Engineering, Inc. (ISPE), acceptable amounts of exposure to a hazardous substance, called Occupational Exposure Limits (OELs), are classified into category 1 to category 6 for manufacturing sites, and it has been increasingly required to meet the most demanding category 6.

Even if a manufacturing site is controlled in accordance with OELs, however, it is difficult to completely prevent the exposure of workers to highly active pharmacological substances. It is necessary to remove highly active pharmacological substances attached to the exposed garments in an exit passageway from the manufacturing site to the outside, so as to reduce the risk of the worker orally inhaling the highly active pharmacological substances re-scattered while changing the clothes and to prevent the highly active pharmacological substances from leaking to the outside.

JP-A 2003-74931 describes an invention of a dust prevention apparatus using air curtains for the entrance to a cleanroom. JP-A 2007-139420 describes an invention of an air shower apparatus disposed at the entrance to a cleanroom suitable for semiconductor manufacturing factories.

SUMMARY OF THE INVENTION

The present invention aims to provide a suction and removal apparatus for sucking and removing powder, such as highly active pharmacological substances, which is excellent in the properties of sucking and removing highly active pharmacological substances and other powders, a powder suction and removal method using the suction and removal apparatus, a suction and removal system using the suction and removal apparatus, and a suction and removal method using the suction and removal system.

The present invention provides a suction and removal apparatus for sucking and removing powder attached to garments of a person in a closed room, the suction and removal apparatus including a suction device, a suction head containing a high efficiency particulate air (HEPA) filter and having a suction port, and a flexible tube connected between the suction device and the suction head:

wherein the suction port of the suction head has a cap that closes the suction port;

wherein the connection between the suction head and the flexible tube is attachable and detachable; and wherein the suction device is installed outside or inside the room and the suction head and part of the flexible tube are installed inside the room. A powder suction and removal method that uses the suction and removal apparatus is also provided.

The present invention also provides a suction and removal system that uses the suction and removal apparatus for sucking and removing powder attached to garments of a person, wherein:

an exit passageway communicating between a workroom where the powder is present and an external environment is divided at least into a first room, a second room and a third room, each of which is closable;

the workroom and the first room, the first room and the second room, the second room and the third room, and the third room and the external environment are each respectively separable and communicable by open and close doors;

the first room is a shower room equipped with an air conditioner or a preparation room before entry into the second room;

the second room is a powder suction and removal room equipped with the suction and removal apparatus; and the third room is a preparation room for exiting to the external environment.

According to the suction and removal apparatus of the present invention and the suction and removal method using the same, the risk of orally inhaling powder, such as highly active pharmacological substances attached to the garments and re-scattered while changing the clothes can be reduced, and the leakage of such powder to the external environment can also be prevented.

According to the suction and removal system of the present invention and the powder suction and removal method using the same, the risk of orally inhaling powder, such as highly active pharmacological substances attached to the garments and re-scattered while changing the clothes can be reduced in a manufacturing site of pharmaceuticals or agrochemicals, and the leakage of such powder to the external environment can also be prevented.

BRIEF DESCRIPTION OF THE DRAWING FIGURES

DETAILED DESCRIPTION OF THE INVENTION (1) Powder Suction and Removal Apparatus The powder to be sucked and removed according to the present invention is powder which may impart negative effects on the health of a human body, such as of a worker, or on surrounding environments. For example, the powder may be a powder of highly active pharmacological substances, including pharmaceutical raw materials, agrochemical raw materials and other chemical substances.

Dust may be floating together with the powder and it is certainly not a highly active pharmacological substance, but as it is not possible to separate out the dust alone, the dust is also to be inevitably removed regardless of whether it is adhered to the highly active pharmacological substances or floating alone.

Figure 1:
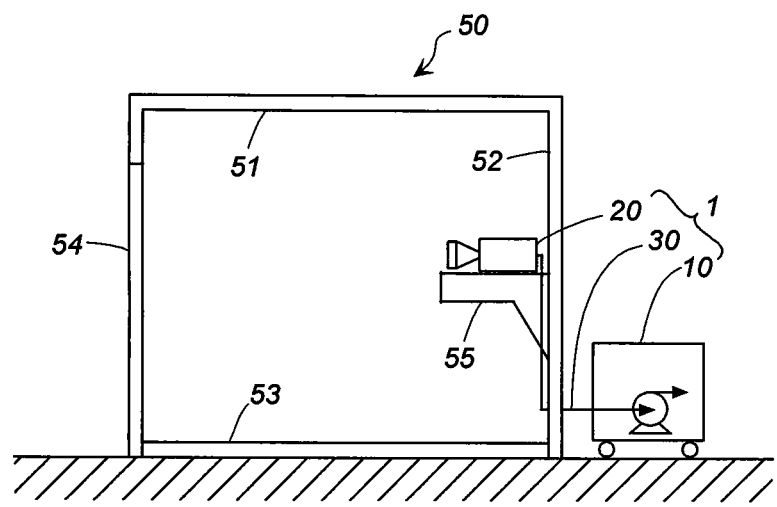
FIG. 1 is an explanatory view of one embodiment of a powder suction and removal apparatus of the present invention.

A suction and removal apparatus 1 shown in FIG. 1 includes a suction device 10, a suction head 20, and a flexible tube 30 connected between the suction device 10 and the suction head 20. The suction device 10 is installed outside a suction and removal room 50 as shown in FIG. 1, but it may be installed inside the room. When the suction device 10 is installed outside the room, it may be movable or stationary, but preferably it is movable and provided with wheels or the like. When the suction device 10 is installed inside the room, it may have a small size for portability.

In the embodiment of FIG. 1 where the suction device 10 is installed outside the room, the suction head 20 and part of the flexible tube 30 are shown to have been disposed in the suction and removal room 50. The flexible tube 30 is connected to the suction device 10 outside the room via a through hole formed in one of walls 52 of the suction and removal room 50. The gap between the flexible tube 30 and the through hole is sealed to attain an impermeable state.

The suction and removal room 50 includes a ceiling 51, the walls 52 and a floor 53, as in a conventional construction. When the suction device 10 is installed inside the room, the exhaust air from the suction device is emitted as is within the room, but the exhaust air is clean because the powder is captured in the suction head 20.

Preferably, the suction force of the suction device 10 is controllable stepwisely or continuously, and a commercially available suction device may be used. The commercially available suction device may be provided with such functions as an inverter for controlling the speed of rotation or a stepwise control.

In FIG. 1, the suction head 20 is shown as having been placed on a rack 55, but it may be hung from one of the walls 52 or suspended from the ceiling 51 by an extendable pantograph or a wire.

Figure 2A:
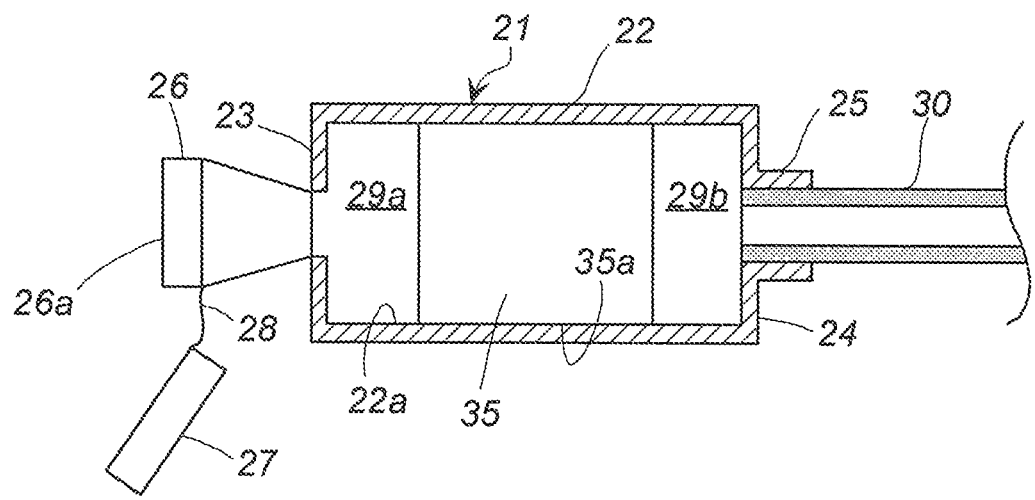
FIG. 2(a) is a cross sectional view of a suction head according to one embodiment of a suction and removal apparatus of the present invention.
Figure 2B:
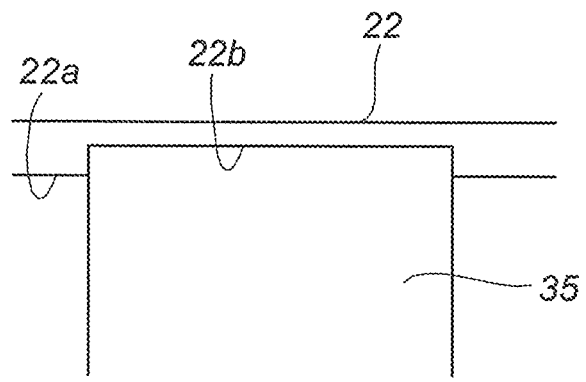
FIG. 2(b) is a partial sectional view of another embodiment different from FIG. 2(a).

As shown in FIG. 2, the suction head 20 includes a housing 21 in which a HEPA filter 35 is contained. The housing 21 may have a circular, elliptical or rectangular cross section in a lateral direction, i.e., in a direction that is transverse to the direction of suction. In the illustrated example, the housing 21 is cylindrical.

The housing 21 is preferably made of a material selected from chlorine-free resins, such as chlorine-free thermoplastic or thermosetting resins, paper, and combinations of these, from the viewpoint of disposal by incineration after use. The housing 21 includes a cylindrical peripheral wall 22, a first end wall 23 that closes a first end of the cylindrical peripheral wall 22 and is provided with a suction port 26, and a second end wall 24 that closes a second end of the cylindrical peripheral wall 22 and is connected to the flexible tube 30.

The cylindrical peripheral wall 22 of the housing 21 may have one or two handles (not shown) on its outer surface, so as to facilitate carrying in one hand or in both hands by the user.

The suction port 26 includes a suction opening 26a and is connected to the first end wall 23, and the suction port 26 is in communication with the interior of the housing 21. A cap 27 tethered, for example by a tether 28, is connected to the suction port 26. The cap 27 is of a size and shape that can close the suction opening 26a of the suction port 26. The cap 27 may be attachable and detachable or it may be fixable with respect to the suction port 26 of the suction head 20.

Preferably, the cap 27 may be attachably and detachably fitted to the suction opening 26a. For example, a recess may be formed in an inner surface of the cap 27 and a projection may be formed on an outer surface of the suction port 26 or suction opening 26a, so that the recess in the inner surface of the cap 27 and the projection on the outer surface of the suction opening 26a mutually fit with each other when the cap 27 is disposed over the suction opening 26a.

Further, one or both of the suction opening 26a and the cap 27 may be formed with an adhesive layer or layers at portions which come in contact with each other when the cap 27 is disposed over the suction opening 26a. In an embodiment formed with such adhesive layer or layers, once the suction opening 26a is closed by the cap 27, they are inseparably fixed with each other.

The second end wall 24 is connected with the flexible tube 30. FIG. 2(*a*) shows that the flexible tube 30 is connected into an annular collar 25 that projects externally from the central part of the second end wall 24. The flexible tube 30 may be made of rubber or a resin, but not limited thereto.

The connection between the annular collar 25 and the flexible tube 30 is attachable and detachable, and the connection may be made by screwing or fitting, or by a ferrule coupling. As such, the housing 21 and the HEPA filter 35 contained in the housing 21 can be separated from the connection with the flexible tube 30 and can be disposed of.

The HEPA filter 35 is defined by the JIS standard, JIS Z 8122, as "a filter having a particle capture rate of 99.97% or more at a rated flow rate for particles that have a size of 0.3 μm and having an initial pressure loss of 245 Pa or less." The present invention may use other filters that have an efficiency comparable with that of the HEPA filter, and such other filters are also referred to as HEPA filters.

At the position where it is disposed, the outer profile of the HEPA filter 35 matches the inner profile of the housing 21 in terms of size and shape, and an outer peripheral surface 35a of the HEPA filter 35 is in close contact with an inner peripheral surface 22a of the cylindrical peripheral wall 22 for the purpose of preventing a short pass or other causes of leakage. A sealant, including an adhesive, may be disposed at the boundary between the outer peripheral surface 35a of the HEPA filter 35 and the inner peripheral surface 22a of the cylindrical peripheral wall 22 for increasing the degree of close contact between them. The HEPA filter 35 shuts down the movement of powder while maintaining air flow between the first end wall 23 and the second end wall 24.

Further, as shown in FIG. 2(*b*), an annular recess 22b corresponding to the outer profile of the HEPA filter 35 may be formed in a part of the inner peripheral surface 22a of the cylindrical peripheral wall 22, and the HEPA filter 35 may be fitted into the annular recess 22b. The embodiment shown in FIG. 2(*b*) may also include a sealant, including an adhesive, between the boundary between the annular recess 22b and the outer peripheral surface 35a of the HEPA filter 35.

(2) Powder Suction and Removal Method

Next, a method that uses the powder suction and removal apparatus 1 for sucking and removing powder attached to the garments of a person is described with reference to FIGS. 1 and 2.

In the following, the description is made for a case where the powder is a powder of highly active pharmacological substances, including pharmaceutical raw materials and agrochemical raw materials, but dust is also to be removed as described above.

The suction and removal room 50 is a closable room, and an open and close door 54 is formed in one of the walls 52. FIG. 1 shows only one open and close door 54, but two open and close doors may be provided to serve as an entrance and an exit, respectively. The suction and removal room 50 may be kept at a pressure lower than the outside of the open and close door 54, so as to prevent inflow or outflow of the powder. For example, when two open and close doors are provided to serve as an entrance and an exit, the suction and removal room 50 may be kept at a pressure lower than that of a separate room accessible via the entrance, and may also be kept at a pressure lower than that of a separate room or outside accessible via the exit.

In an embodiment where the suction device 10 is installed outside the room as shown in FIG. 1, the suction device 10 is installed outside the suction and removal room 50 and the suction head 20 and part of the flexible tube 30 are installed inside the suction and removal room 50. In an embodiment where the suction device 10 is installed inside the room, the suction device 10 may be placed on the floor 53 of the suction and removal room 50, but it may also be placed on a separately provided rack to facilitate manipulation by the user.

In a first step, the user starts up the suction device 10. For example, the user opens the open and close door 54 of the suction and removal room 50 to enter the room, closes the open and close door 54, and presses a start switch on a control panel located inside the room to startup the suction device 10. Alternatively, a sensor for activating the suction device 10 may be attached to one of the walls 52, so that the suction device 10 starts up automatically upon detection of approach of the user. When the suction device 10 is installed inside the room, a control panel of the suction device 10 may be directly manipulated.

In a second step, the user draws the suction port 26 of the suction head 20 closer for sucking and removing powder attached to the garments. If, for example, the suction head 20 is suspended from the ceiling 51 by an extendable pantograph or a wire, such is preferable as the suction head 20 can then be handled easily and lightly.

As a laboratory coat or a cleanroom suit is often worn over the clothing in pharmaceutical production sites or cleanrooms, the "garments" herein may mean "laboratory coat" or "cleanroom suit."

When the powder attached to the garments is sucked with the suction head 20, the powder enters a first space 29a in the housing 21 and then absorbed and retained by the HEPA filter 35. The powder thus does not enter a second space 29b, and also does not enter the flexible tube 30.

In a third step, upon completion of the suction and removal of the powder, the user lowers the suction force of the suction device 10. The reduction of the suction force may be made by, for example, manipulating an operation switch on the control panel located inside the room. When the suction device 10 is installed inside the room, the control panel of the suction device 10 may be directly manipulated.

In the third step, the suction force of the suction device 10 is preferably reduced to a level that is 50% or less of the suction force used for sucking and removing the powder in the second step.

In a fourth step, after the suction force of the suction device 10 is lowered, the suction opening 26a of the suction head 20 is closed by covering with the cap 27, and the suction device 10 is shutdown. As the suction force has been lowered, damages to the housing 21 due to no-discharge operation can be avoided.

If the third step is omitted and the suction opening 26a is covered with the cap 27 in the fourth step after shutting down the suction device 10, a backflow of air entraining powder may occur from the housing 21 via the suction opening 26a to blow the powder over the user during the period between the shutdown of the suction device 10 and the covering of the suction opening 26a with the cap 27. As such, it is necessary to combine the third step and the fourth step.

Alternatively, a sensor may be attached to the suction port 26 so that the suction force of the suction device 10 is automatically lowered when the cap 27 is moved closer to the suction port 26 and the suction device 10 is shutdown when the cap 27 completely covers the suction opening 26a.

On the basis of the category of OEL or the like, a limitation on the number of uses may be determined for the suction head 20 used in the suction and removal method of the present invention. When the limitation number is reached, the suction head 20 may be detached from the flexible tube 30 and disposed of or incinerated to prevent further reuse. Such an operational rule can circumvent the risk of exposure involved in exchanging the filter element and can prevent negative effects on surrounding environments.

(3) Suction and Removal System

The suction and removal system of the present invention utilizes the aforementioned suction and removal apparatus for sucking and removing powder attached to the garments of a person.

Figure 3:
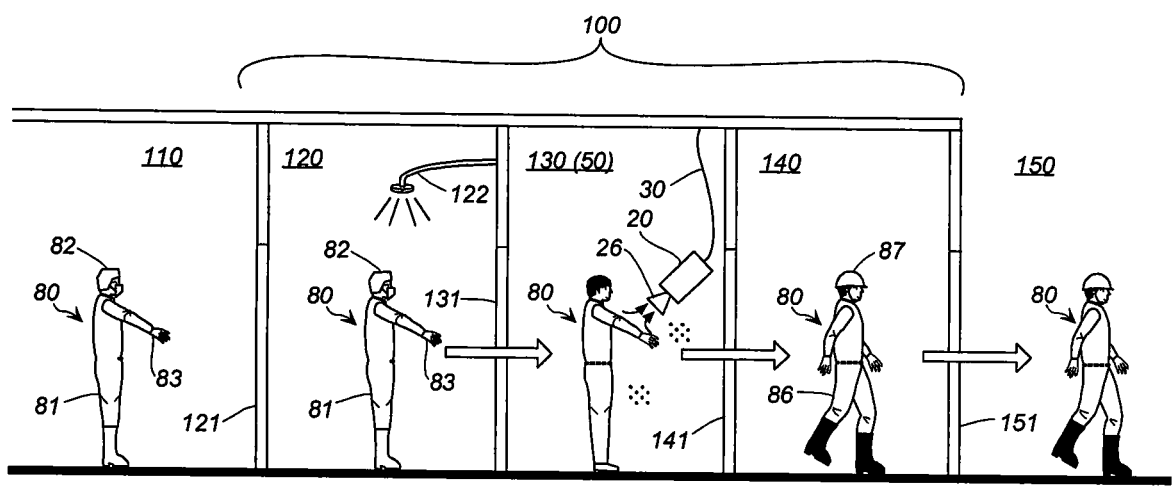
FIG. 3 is an explanatory view of one embodiment of a powder suction and removal system of the present invention.

FIG. 3 shows an embodiment of a suction and removal system 100, in which an exit passageway communicating between a workroom 110 where the powder is present and an external environment 150 is divided into at least a first room 120, a second room 130 and a third room 140, each of which is closable. The suction and removal system 100 includes the first room 120 to the third room 140.

The suction and removal system 100 may include four or more rooms, depending on the condition of the workroom 110. For example, when a particularly high active substance is used in the workroom 110, an airlock room may be added between the second room 130 and the third room 140 to a total of four rooms.

In an embodiment, the workroom 110 may be a space for manufacturing pharmaceuticals or agrochemicals in which highly active pharmacological substances including pharmaceutical raw materials and agrochemical raw materials are used, for example, a cleanroom of a pharmaceutical manufacturing site. A worker 80 is shown wearing a cleanroom suit 81, a cap 82, gloves 32 and a mask. In the following, the cleanroom suit 81, a laboratory coat or the like garments exposed to a powder such as highly active pharmacological substances, the cap 82, the gloves 83 and the mask inclusive, may be referred to as "working coat." The external environment 150 may include corridors at the atmospheric pressure, the outdoor or another building.

The first room 120 can be isolated from or communicate with the workroom 110 by an open and close door 121. The first room 120 is a shower room equipped with an air conditioner, such as an air shower room, a mist shower room or an emergency shower room. Alternatively, it is a preparation room before entry into the second room 130.

The emergency shower room may be used when the worker is heavily exposed to a chemical substance, including powders and liquids. It may usually be provided separately from the suction and removal system 100, but it may be provided to the suction and removal system 100 to prepare for emergency situations. When the shower room is an air shower room, a mist shower room or an emergency shower room, a shower 122, such as an air shower or mist shower, may be installed to a wall or ceiling (it is installed to a wall in FIG. 3). When used as a preparation room, there may be no installation in the room.

Preferably, the first room 120 and the workroom 110 are controlled in such a manner that the pressure in the workroom 110 is lower than the pressure in the first room 120, so as to prevent powder floating in the workroom 110 from flowing into the first room 120.

The second room 130 may use the construction of the closable suction and removal room 50 provided with two open and close doors to serve as an entrance and an exit, as well as the suction and removal apparatus 1, as discussed above in connection with FIG. 1. Alternatively, the suction and removal room 50 may be used after modifying it in connection with the first room 110 and the third room 130 as necessary.

The second room 130 can be isolated from or communicate with the first room 120 by an open and close door 131. The pressures in the first room 120 and the second room 130 may be designed such that the pressure in the second room 130 is made lower to prevent foreign substances from flowing into the first room 120. Alternatively, the pressure in the first room 120 may be designed to be lower so that highly active substances normally flow toward the manufacturing room.

The third room 140 is a preparation room before exiting to the external environment 150. The third room 140 can be isolated from or communicate with the second room 130 by an open and close door 141, the external environment 150 can be isolated from or communicate with the third room 140 by an open and close door 151.

The third room 140 and the external environment 150 are preferably controlled such that the pressure in the third room 140 is higher than the atmospheric pressure in the external environment 150. Also, the first room 120, the second room 130, and the third room 140 are preferably controlled such that the pressures in the first room 120 and the second room 130 are lower than the pressure in the third room 140.

(4) Powder Suction and Removal Method Using the Suction and Removal System

A method that uses the powder suction and removal system of the present invention is now described on the basis of FIG. 3 and also with reference to FIGS. 1 and 2.

In the following, the workroom 110 for handling highly active pharmacological substances is referred to as a cleanroom, and an embodiment for exiting from the cleanroom 110 to the external environment 150 is described as including step A to step F. More than one of these steps may be combined together and implemented as a single step.

The second room 130 may use the construction of the closable suction and removal room 50 provided with two open and close doors to serve as an entrance and an exit, as well as the suction and removal apparatus 1, as discussed above in connection with FIG. 1.

In step A, the worker 80 wearing the working coat in the workroom, i.e., the cleanroom 110, opens the open and close door 121 between the cleanroom 110 and the first room 120 to enter the first room 120, and thereafter closes the open and close door 121 to close off the first room 120.

In the next step B, when the first room 120 is an air shower room, the worker 80 takes the shower 122, which is an air shower, stops the shower 122, and the scattered powder is captured by the air conditioner in the first room 120. When the first room 120 is a mist shower room, the worker 80 takes the shower 122, which is a mist shower, and stops the shower 122. The scattered powder and the powder still attached to the working coat are dampened to prevent re-scattering.

When the first room 120 is a preparation room not equipped with a shower such as an air shower or a mist shower, the worker 80 does not perform any removal operations. An air conditioner may be equipped in each room, and a HEPA filter may be used as the filter of the air conditioner In the next step C, the worker 80 opens the open and close door 131 between the first room 120 and the second room 130 (suction and removal room 50) to enter the second room 130, and thereafter closes the open and close door 131 to close off the second room 130.

In the next step D, the worker 80 uses the suction head 20 of the suction and removal apparatus 1 in the second room 130 for sucking and removing the powder attached to the working coat, and thereafter takes off the working coat. As the powder attached to the working coat is sucked and removed by the suction and removal apparatus 1 and the working coat is taken off in the second room 130, the risk of the powder attached to the working coat entering into the following third room 140 can be sufficiently lowered.

When an undressing room is added between the first room 120 and the second room 130, after taking the air shower or mist shower in the first room 120, the worker 80 may take off the working coat in the undressing room and then enter the second room 130 for removing powder by the suction and removal apparatus 1. The working coat taken off in the second room 130 (or in the undressing room) may be reused if, for example, the same product is to be manufactured in the cleanroom 110. If a different product is to be manufactured or powder is significantly attached to the working coat and not considered to have been sufficiently removed by the suction device, the working coat may be disposed of.

In the next step E, the worker 80 opens the open and close door 141 between the second room 130 and the third room 140 to enter the third room 140, and thereafter closes the open and close door 141 to close off the third room 140.

In the last step F, after preparing to exit from the third room 140 to the external environment 150, the worker 80 opens the open and close door 151 between the third room 140 and the external environment 150 to exit to the external environment 150, and thereafter closes the open and close door 151. The worker 80 may wear a helmet 87 or put on a different working coat 86 in the third room 140, before exiting to the external environment 150.

The suction and removal method that uses the suction and removal system of the present invention includes the first room 120, the second room 130 and the third room 140, but further rooms may be added as necessary.

According to the suction and removal method that uses the suction and removal system of the present invention, even if the worker 80 is exposed to a small amount of highly active pharmacological substances in the cleanroom 110, the risk of oral inhalation due to re-scattering or the risk of indoor contamination due to re-scattering can be reduced before the worker walks out to the external environment 150. As such, the possibility of impairing the health of the worker 80 is significantly lowered and environmental contamination to the external environment 150 does not occur.

The suction and removal apparatus and the suction and removal system of the present invention, as well as the removal methods using them, may be used in an exit passageway from a pharmaceuticals manufacturing site or an agrochemicals manufacturing site, where highly active pharmacological substances are processed.

The invention claimed is:

1. A suction and removal apparatus for sucking and removing powder attached to garments of a person in a closed room, the suction and removal apparatus comprising:
   a suction device,
   a suction head including a housing, a high efficiency particulate air (HEPA) filter contained in the housing, and a suction port, and
   a flexible tube connected between the suction device and the suction head, wherein
   the suction port of the suction head has a cap that closes the suction port;
   the housing includes a cylindrical peripheral wall, a first end wall that closes a first end of the cylindrical peripheral wall and is provided with a suction port, and a second end wall that closes a second end of the cylindrical peripheral wall and is connected to the flexible tube;
   the HEPA filter is in close contact with an inner surface of the cylindrical peripheral wall of the housing for shutting down movement of the powder while maintaining air flow between the first end wall and the second end wall;
   the housing and the HEPA filter can be separated from the connection with the flexible tube and disposed of;
   the connection between the suction head and the flexible tube is attachable and detachable; and
   the suction device is installed outside or inside the room and the suction head and part of the flexible tube are installed inside the room.

2. The suction and removal apparatus of claim 1, wherein the housing is made of a material selected from chlorine-free resins, paper, and combinations of these.

3. The suction and removal apparatus of claim 1, wherein the cap is attachable and detachable or fixable with respect to the suction port of the suction head.

4. The suction and removal apparatus of claim 1, wherein the powder is selected from highly active pharmacological substances, including pharmaceutical raw materials and agrochemical raw materials.

5. A method that uses the suction and removal apparatus of claim 1 for sucking and removing powder attached to garments of a person in a closed room, the method comprising:
   a first step of manipulating to startup the suction device by the person;
   a second step of drawing the suction port of the suction head closer to the person and sucking and removing powder attached to the garments;
   a third step of manipulating the suction device to lower a suction force upon completion of the sucking and removing of the powder; and
   a fourth step of shutting down the suction device after the suction force of the suction device is lowered and the suction port of the suction head is closed by covering with the cap.

6. The method of claim 5, wherein in the third step the suction force of the suction device is reduced to a level that is 50% or less of a suction force used for the sucking and removing the powder in the second step.

7. A suction and removal system for sucking and removing powder attached to garments of a person, the suction and removal system comprising:
   an exit passageway, the exit passageway communicating between a workroom where the powder is present and an external environment, the exit passageway being divided into at least a first room, a second room and a third room, wherein
   each of the workroom, the first room, the second room, and the third room is closable;
   the workroom and the first room, the first room and the second room, the second room and the third room, and the third room and the external environment are each respectively separable and communicable by open and close doors;
   the first room is a shower room equipped with an air conditioner or a preparation room before entry into the second room;
   the second room is a powder suction and removal room equipped with the suction and removal apparatus of claim 1; and
   the third room is a preparation room for exiting to the external environment.

8. The suction and removal system of claim 7, wherein
   the workroom and the first room are controlled so that the pressure in the workroom is lower than the pressure in the first room;
   the third room and the external environment are controlled so that the pressure in the third room is higher than the atmospheric pressure in the external environment; and
   the first room, the second room, and the third room are controlled so that the pressures in the first room and the second room are lower than the pressure in the third room.

9. The suction and removal system of claim 7, wherein the workroom is a space for manufacturing pharmaceuticals or agrochemicals in which highly active pharmacological substances including pharmaceutical raw materials and agrochemical raw materials are used.

10. A method that uses the suction and removal system of claim 7 for sucking and removing powder, the method comprising:
   a step A of opening, by a worker wearing a working coat in the workroom, the open and close door between the workroom and the first room to enter the first room, and thereafter closing the open and close door between the workroom and the first room to close off the first room;
   a step B of taking, when the first room is an air shower room, an air shower by the worker, stopping the air shower, and capturing the scattered powder by the air conditioner, or taking, when the first room is a mist shower room, a mist shower by the worker, stopping the mist shower, and damping the scattered powder and the powder still attached to the working coat to prevent re-scattering;
   a step C of opening, by the worker, the open and close door between the first room and the second room to enter the second room, and thereafter closing the open and close door between the first room and the second room to close off the second room;
   a step D of using, by the worker, the suction and removal apparatus in the second room for sucking and removing the powder attached to the working coat, and thereafter taking off the working coat;
   a step E of opening, by the worker, the open and close door between the second room and the third room to enter the third room, and thereafter closing the open and close door between the second room and the third room to close off the third room; and
   a step F of opening by the worker, after preparing to exit from the third room to the external environment, the open and close door between the third room and the external environment to exit to the external environment under the atmospheric pressure, and thereafter closing the open and close door between the third room and the external environment.

11. A method that uses the suction and removal system of claim 7 for sucking and removing powder, the method comprising:

a step A of opening, by a worker wearing a working coat in the workroom, the open and close door between the workroom and the first room to enter the first room, and thereafter closing the open and close door between the workroom and the first room to close off the first room;

a step B of not performing any removal operation by the worker when the first room is a preparation room;

a step C of opening, by the worker, the open and close door between the first room and the second room to enter the second room, and thereafter closing the open and close door between the first room and the second room to close off the second room;

a step D of using, by the worker, the suction and removal apparatus in the second room for sucking and removing the powder attached to the working coat, and thereafter taking off the working coat;

a step E of opening, by the worker, the open and close door between the second room and the third room to enter the third room, and thereafter closing the open and close door between the second room and the third room to close off the third room; and a step F of opening by the worker, after preparing to exit from the third room to the external environment, the open and close door between the third room and the external environment to exit to the external environment under the atmospheric pressure, and thereafter closing the open and close door between the third room and the external environment.

* * * * *